Nov. 20, 1956 P. K. WEIMER 2,771,567

COLOR TELEVISION

Filed July 30, 1954 2 Sheets-Sheet 1

INVENTOR.
PAUL K. WEIMER
BY
[signature]
ATTORNEY

Nov. 20, 1956 P. K. WEIMER 2,771,567

COLOR TELEVISION

Filed July 30, 1954 2 Sheets-Sheet 2

INVENTOR.
PAUL K. WEIMER
BY
[signature]
ATTORNEY

United States Patent Office 2,771,567

Patented Nov. 20, 1956

2,771,567

COLOR TELEVISION

Paul K. Weimer, Princeton, N. J., assignor to Radio Corporation of America, a corporation of Delaware Application July 30, 1954, Serial No. 446,843

14 Claims. (Cl. 315—21)

The present invention relates to color television apparatus and, more particularly, to novel apparatus for providing information regarding the position of a scanning beam in a cathode ray tube having a target structure comprising a plurality of groups of strip-like elements definitive of different selected component colors of an object.

In the development of color television, there have been proposed various arrangements and methods for the reproduction of color television images from substantially simultaneous signals indicative, respectively, of certain selected component colors of the subject being televised. One arrangement which has been proposed in the prior art is a color image reproducing device or kinescope which includes means for causing a single electron beam to scan transversely of a target structure which has come to be known as a "picket fence" type of target in which there are arranged repeating series of strip-like elements of different phosphor types capable of emitting light of different selected component colors in response to electron bombardment.

According to one form of the apparatus described above, means are provided in the target structure for producing a signal indicative of the position of the scanning electron beam with respect to the phosphor strip elements, such signals being employed for keying the beam intensity controlling electrode of the kinescope with signals representative of the different selected colors of the image at the time that the beam is traversing the phosphor strip adapted to emit light of the color in question. Each series of phosphor strips includes means for providing a pulse when that series or group of phosphor strips is scanned. An appropriate pulse delay arrangement is employed to control switching means sequentially to key in the video signals corresponding to the appropriate color representative phosphor strips of the target.

It is a primary object of the present invention to provide new and improved means for the reproduction of color television images.

Another and more specific object of the invention is the provision of means for reproducing a color television image through the agency of a kinescope target or screen of the so-called "picket fence" variety and in which the repetitive series of phosphor strip groups are scanned transversely by a single electron beam.

In general, the present invention contemplates the realization of the above aims through the agency of an arrangement including a kinescope having a novel target structure which includes a plurality of repeating, adjacently positioned and similar groups of vertical strip-like sections, each strip-like section of a group being limited in its light representation to one selected component color. In each group, one of the strip-like sections corresponding to a given color is electrically connected to the strip-like section of each of the other groups representative of the same color. The remaining strip-like sections of each of the groups are electrically connected to each other and to a source of suitable operating potential. In accordance with the invention the first mentioned strip-like sections of the group are connected to a source of potential in such manner as to provide a pulse or signal when scanned by the electron beam, which pulse or signal may then be suitably employed for controlling the application of the several color representative television signals to the kinescope's control electrode. Scansion of the second recited set of strip-like sections by the electron beam is prevented by means of a novel circuit arrangement from producing signals which might interfere with the signals of the first recited set.

As will be appreciated more fully from the following, the arrangement of the present invention for deriving keying pulses electrically from one set of color phosphors through the agency of conductive elements connected to that set of phosphors in such manner that no interfering signal is produced by the other phosphor strip-like elements is advantageous in that it does not require the use of either optical systems or separate grill-like signal producing conductors such as have been proposed in the past and which necessarily prevent the complete utilization of the phosphor strip-like elements for image resolution.

Additional objects and advantages of the present invention will become apparent to persons skilled in the art from a study of the following detailed description of the accompanying drawing in which.

Figure 1:
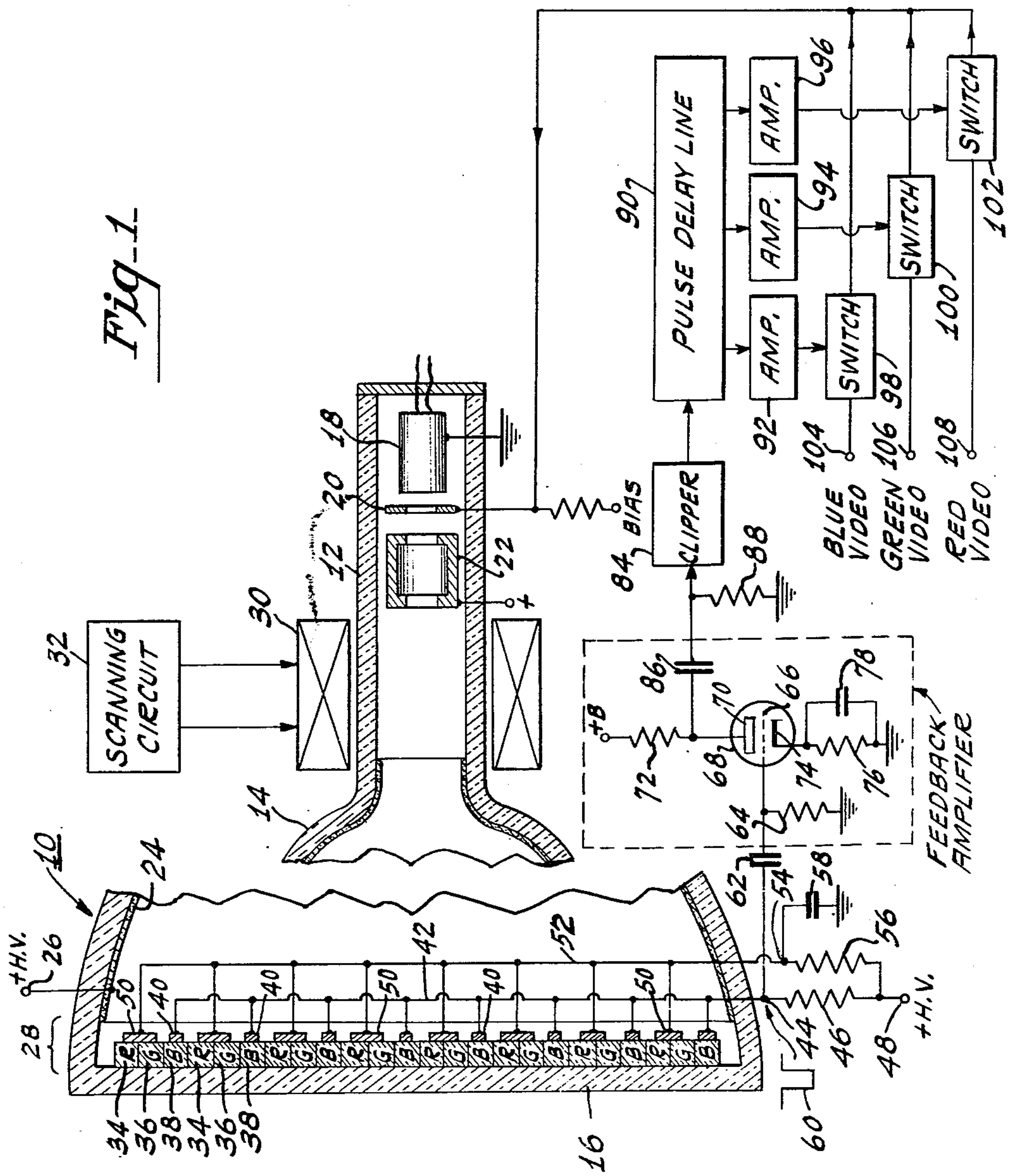
Fig. 1 illustrates one form of the invention.

Referring to the drawing and, in particular, to Fig. 1 thereof, a cathode ray tube constructed in accordance with the invention and embodied in the form of a kinescope is indicated generally by reference numeral 10. The tube comprises an evacuated envelope consisting of a cylindrical neck portion 12 terminating in a flared or conical portion 14 whose end is enclosed by a transparent face plate 16. While the entire envelope of the cathode ray tube 10 is indicated in the drawing as being fabricated of glass, those skilled in the art will understand that, with the exception of the face plate 16, the remainder of the tube or any part thereof may be constructed of a suitable metal. The cylindrical neck portion 12 of the cathode ray tube 10 includes a conventional electron gun structure illustrated as comprising an indirectly heated cathode 18, a beam intensity controlling electrode 20 and an accelerating electrode 22, all of which are connected to suitable operating bias potentials, as shown. The interior surface of the flared portion 14 of the tube is coated with a conductive material 24 which is connected to a source of high positive potential at the terminal 26 and which serves as the final anode of the tube. An electron beam produced by the gun structure is adapted to travel through the neck of the tube and to impinge upon the target structure 28. Suitable deflection means for causing the electron beam to scan a rectangular raster on the target structure 28 is illustrated diagrammatically by the electromagnetic deflection 30 which receives horizontal and vertical frequency deflection currents from the scanning circuits 32. As thus far described, the cathode ray tube 10 of Fig. 1 is or may be entirely conventional in structure, so that detailed description thereof is unnecessary here.

In order that the cathode ray tube 10 may produce colored images in response to video signals applied to its beam controlling electrode 20, the target structure 28 includes a plurality of groups of strip-like elements of different light emitting characteristics. In the embodiment of Fig. 1, each group comprises red, green and blue light emitting phosphor strips 34, 36 and 38. The groups are arranged in such manner that the phosphor strips of the several groups follow a regular, repetitive arrangement such as R, G, B, R, G, B. Assuming that each group of red, green and blue phosphors 34, 36 and 38 is of a width equal to an elemental area of the television image, it will be understood that, as the electron beam within the tube scans across the several groups of strips, the target of the cathode ray tube will provide red, green and blue light in a sub-elemental, sequential manner. Specific compositions for the several different color emitting phosphor strips may be of any suitable types. One form of tube for a color strip target area formed from suitable compounds which luminesce in desired selected component colors has been described in U. S. Patent No. 2,310,863 granted February 9, 1943, to H. W. Leverenz, and reference may be made to that patent for the compositions.

One major difficulty with cathode ray tubes of the so-called picket fence variety of the type described herein is that of insuring that the proper color emitting phosphor strip is being traversed by the electron beam for the color representative video signal which is modulating the intensity of the beam. In view of the gravity of this problem there have been many proposals in the prior art for producing indexing signals which are intended to indicate the position of the scanning beam with respect to the phosphor groups. Certain of the proposals have involved the use of indexing elements arranged in parallelism with the groups, which elements have a predetermined secondary electron emissive characteristic, such that a secondary electron color provides signals in response to the traverse of the indexing elements by the electron beam. Difficulty has been experienced, however, with the use of elements depending upon secondary electron emission, by reason of the fact that a great ratio of secondary emission characteristics between the indexing elements and the phosphor strips is necessary for the derivation of meaningful signals from the strips. Other proposals have involved the use of conductors arranged in front of (i. e. nearer the electron beam source) the phosphor strips for providing the indexing impulses. Such arrangements, of necessity, reduce the useful area of the phosphor strips and, therefore, reduce the resolution of the resultant image.

The present invention, as opposed to the prior art proposals, affords index signal producing means which are characterized as follows: assuming that the blue strip-like selective light producing element is chosen to provide the indexing signal as it is scanned by the electron beam, the present invention provides a conductive strip which may be substantially coextensive with the blue strip and a second conductive strip which may be substantially coextensive with both the red and green strips. All of the conductive strips associated with the blue elements are electrically connected to each other, while all of the conductive strips associated with both the red and green elements are connected to each other but not to the strips associated with the blue elements. Through novel circuit means to be described hereinafter, scansion of the strips by the electron beam produces a voltage pulse at a signal terminal each time a blue strip is traversed. Means are also provided in the circuit for preventing the production of any signals during scansion of the red and green strips. In this manner, indexing signals of large amplitude and suitable signal-to-noise ratio are derived for controlling the application of the color representative video signals to the kinescope. As described generally, therefore, it will be seen in Fig. 1 that each of the blue light emitting strip-like elements 38 is coated on its surface nearer the electron beam source with a layer 40 of electron-transparent, conductive material. As is well-known, a thin layer of aluminum, for example, meets the requirements of both electron transparency and conductivity for the present use and may, therefore, be employed as the material for the layers 40. All of the strip-like layers 40 which are associated with the blue phosphor strips 38 are electrically connected to each other through a common lead 42 which is connected at one end to a terminal 44. The terminal 44 is, in turn, connected through a load impedance illustrated as a resistor 46 to a source of high positive potential at the terminal 48, for purposes which will become apparent. Each pair of red and green light emitting phosphor strips 34 and 36, respectively, is provided with a coating layer 50 which may also be formed of aluminum and which may be substantially coextensive with the red and green strips. The conductive strips 50 are connected to each other electrically through the agency of a common lead 52, one end of which is connected to a terminal 54. The terminal 54 is, in turn, connected to the positive potential source terminal 48 through the resistor 56 and to alternating current ground through a bypass capacitor 58 having a low impedance for the frequency with which the pairs of red and green strips are scanned by the electron beam.

In the operation of the apparatus of Fig. 1 as described thus far, the electron beam from the cathode 18 is caused to scan across the groups of phosphor strips 34, 36 and 38 of the target 28. Each time the beam traverses one of the conductive layers 40 associated with the blue phosphor strips 38, a circuit is completed through the layer 40, lead 42 and resistor 46 to the high voltage supply, thereby producing a current through the resistor 46 which results in the production of an indexing pulse 60 at the terminal 44. Since it is necessary to maintain the red and green light emitting phosphor strips 34 and 36 at the same potential as the blue strips in order to prevent undesirable effects upon the acceleration and deflection of the electron scanning beam, the resistor 56 is chosen of such value as to provide a potential at the terminal 54 which is equal to the direct current potential at the terminal 44. On the other hand, in order to enable the derivation of accurate and well-defined indexing signals from the scansion of the conductive layers 40, it is necessary to prevent the scanning of the layers 50 from producing signals which might interfere with the indexing signals. Such prevention is afforded by the capacitor 58 which serves to shunt to ground any alternating current variations produced by the scansion of the conductive layers 50.

The indexing signals 60 produced as above described are coupled via a capacitor 62 and a resistor 64 to the control electrode 66 of a conventional amplifier 68. The anode 70 of the amplifier tube 68 is connected to a source of positive operating potential (indicated as +B) through a load resistor 72, while the cathode 74 of the amplifier is connected to ground through a conventional self-biasing arrangement comprising the parallel combination of a resistor 76 and bypass capacitor 78.

The pulses 60 are amplified and inverted by the amplifier 68 and are applied to a clipper circuit 84 via the coupling capacitor 86 and resistor 88. The clipper circuit 84, which may not be necessary in all cases, may take any well-known form. The output of the clipper 84 is applied to the input of a pulse delay line 90 which may also take any well-known form such as that described in an article entitled "Video delay lines," Proceedings of the IRE, December 1947.

Pulse amplifiers 92, 94 and 96 are connected at appropriate points in the pulse delay line 90 in order to control the electronic switches 98, 100 and 102 in such manner that the blue, green and red video signals applied to their input terminals 104, 106 and 108 may be properly passed to the control electrode 20 of the cathode ray tube 10.

The connections of the amplifiers 92, 94 and 96 to the delay line 90 are arranged so that the blue video signal from the terminal 104 is applied to the control electrode 20 during that interval of time that the electron beam is scanning across the blue strip 38 and its conductive layer 50 and as indicated by the pulse 60 thus produced. Similarly, the switches 100 and 102 are connected to the delay line in such manner as to pass the green and red video signals to the control electrode 20 during those times that the electron beam is traversing the green and red light emitting strips 36 and 34.

Since suitable circuitry for use in performing the functions of the pulse amplifiers and switches is well described in the prior art, specific circuitry is not illustrated herein.

Although no specific source has been illustrated herein for the blue, green and red video signals which are applied to the terminals 104, 106 and 108, respectively, it should be understood that any conventional color television receiver which provides such signals simultaneously may be employed.

From the foregoing, it will be noted that the present invention provides novel and improved apparatus for producing indexing signals indicative of the instantaneous location of a scanning beam in a cathode ray tube with respect to a plurality of groups of strip-like, color definitive elements. Moreover, by virtue of the circuitry of the invention insurance is afforded against undesirable interaction of the index signal producing means and the scanning processes.

Figure 2:
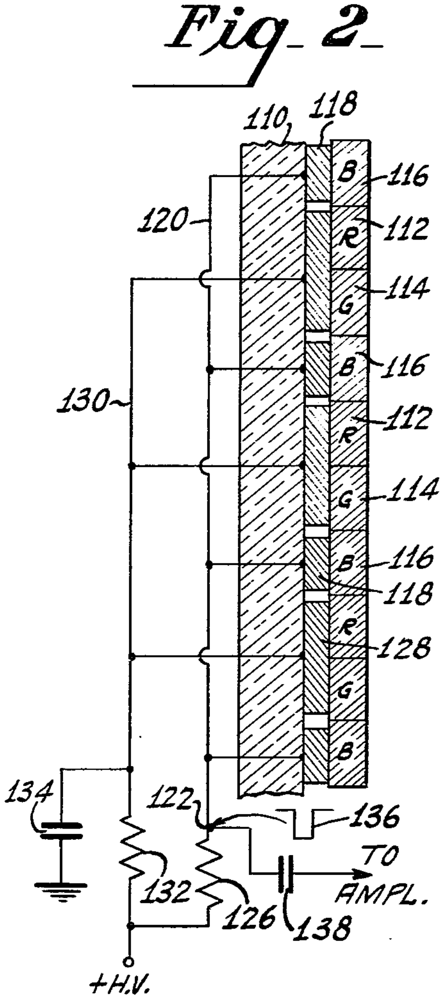
Fig. 2 illustrates a modified form of the invention, by way of a fragmentary view.

Fig. 2 illustrates, by way of a fragmentary view, a portion of a cathode ray tube target in accordance with another form of the invention. In the illustration of Fig. 2, there is provided a cathode ray tube face plate 110 which serves to support a plurality of groups of strip-like elements 112, 114 and 116 having different, selected component color light characteristics. By way of example, the strip-like elements 112, 114 and 116 may be identical to the red, green and blue light emitting phosphors 34, 36 and 38, respectively, of Fig. 1. Located between the transparent support 110 and each of the blue phosphor strips 116 is a layer 118 of suitable transparent conducting material, such as stannic oxide or evaporated gold, which layer may be substantially coextensive with its associated phosphor strip. All of the transparent conductive layers 118 are connected electrically to each other through a common lead 120 which is, in turn, connected to a signal terminal 122. The terminal 122 is connected to a source of high positive potential at the terminal 124 through a load resistor 126. Each pair of red and green phosphor strips 112 and 114 is coated on its surface adjacent the support 110 with a transparent conductive layer 128. Each of the layers 128 may be substantially coextensive with its associated pair of red and green phosphors 112 and 114. The transparent conductive layers 128 are electrically joined to each other through a common lead 130 which is connected to the positive potential terminal 124 through a dropping resistor 132 which is bypassed to alternating current ground by a capacitor 134.

In the operation of the apparatus of Fig. 2, as will be understood from the description of Fig. 1, an electron beam is caused to traverse the several groups of phosphor strips and, as it scans each of the blue strips 116, a current will be produced through the layer 118, lead 120 and resistor 122 to provide an indexing pulse signal 136. Traversal by the beam of the red and green phosphors 112 and 114 will cause a current to flow in the lead 130 but, by virtue of the bypassed capacitor 134, such current will be shunted to ground, thereby preventing the introduction of any signal corresponding thereto at the terminal 122 which might otherwise occur (i. e. in the absence of the capacitor 134) as by reason of the common power supply and the capacity existing within the tube between the two sets of conducting strips 118 and 128 connected to the terminal 124. Thus, the indexing signals 136 may be coupled via a capacitor 138 to circuitry such as that shown in Fig. 1 for controlling the application of the several color representative video signals to the control electrode in the kinescope with which the target is associated.

Figure 3:
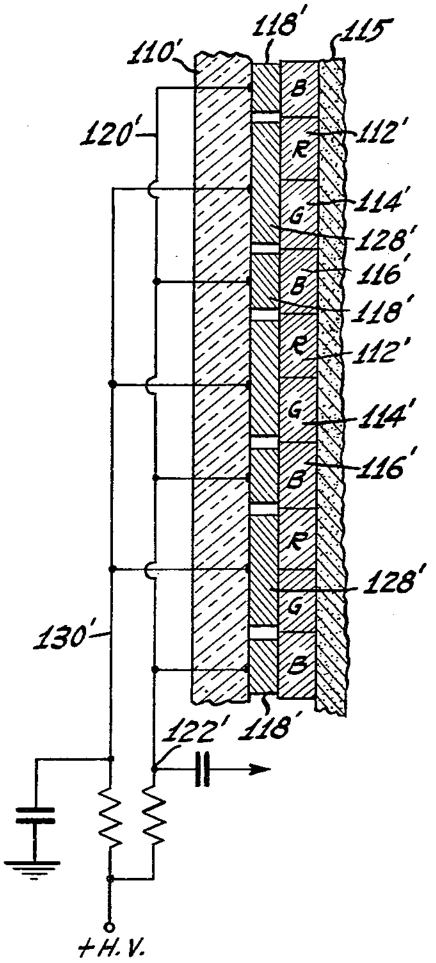
Fig. 3 is a view similar to that of Fig. 2 but illustrating still another form of the invention.

Fig. 3 illustrates still another form of the invention, similar to that of Fig. 2 in that it provides, in a cathode ray tube target and on a transparent support 110′, a plurality of groups of color definitive, strip-like elements 112′, 114′ and 116′ which are definitive, respectively, of red, green and blue component colors. In the case of Fig. 3, however, the strips 112′, 114′ and 116′ are formed of suitable light selective filter materials rather than of light emitting phosphors. A coating of phosphor material 115 is provided over all of the filter strips 112′, 114′ and 116′, such that bombardment of the phosphor material 115 results in the emission thereby of substantially polychromatic light. Each of the filter strips, however, is capable of passing light of only its designated color, as will be understood. Each of the blue filter strips 116′ is provided on its surface adjacent the transparent support 110′ with a layer 118′ of transparent, conductive material which may be substantially coextensive with the filter strip. All of the strips 118′ are connected to each other electrically by a lead 120′ which terminates at an indexing signal terminal 122′. Each pair of red and green filter strips 112′ and 114′ is provided with a layer 128′ of the same transparent, conductive material as that used for the layers 118′, layers 128′ being substantially coextensive with their associated filter pairs. The layers 128′ are connected to each other by a conductor 130′. The circuitry to which the conductors 120′ and 130′ are connected in Fig. 3 is illustrated as being identical to that shown in Figs. 1 and 2 for the production of indexing signals at the terminal 122′ in response to traversal of the blue strips 116′ by an electron beam. Each of the filter strips in Fig. 3 must, as will be appreciated, be of conducting material, in order that an electric circuit may be completed through them, as will be understood.

While the present invention has been described in accordance with certain specific embodiments for producing indexing signals which are employed in a specific manner, it should be borne in mind that the indexing signals produced in accordance with the invention may be employed for performing other functions in the color television image operation.

Having thus described my invention, what I claim as new and desire to secure by Letters Patent is:

1. In a cathode ray tube having means for producing an electron beam, a target comprising a plurality of groups of strip-like elements, each element of a group being definitive of a different selected component color of an image being televised and each group including at least three of said strip-like elements; a strip-like layer of conductive material on each of said color-definitive strip-like elements representative of a first color; and a strip-like layer of conductive material in each of said groups coextensive with at least a part of each of those strip-like color-definitive elements in that group other than that element representative of said first color.

2. In a cathode ray tube having means for producing an electron beam, a target comprising a plurality of groups of strip-like elements, each element of a group being definitive of a different selected component color of an image being televised and each group including at least three of said strip-like elements; a strip-like layer of conductive material on each of said color-definitive strip-like elements representative of a first color; a strip-like layer of conductive material in each of said groups coextensive with at least a part of each of those strip-like color-definitive elements in that group other than that element representative of said first color; and means electrically joining only said strip-like layers which are on said elements representative of said first color.

3. In a cathode ray tube having means for producing an electron beam, a target comprising a plurality of groups of strip-like elements, each element of a group being definitive of a different selected component color of an image being televised and each group including at least three of said strip-like elements; a strip-like layer of conductive material on each of said color-definitive strip-like elements representative of a first color; a strip-like layer of conductive material in each of said groups coextensive with at least a part of each of those strip-like color-definitive elements in that group other than that element representative of said first color; means electrically joining only said strip-like layers which are on said elements representative of said first color; and means electrically joining only said strip-like layers which are on said elements representative of said other colors.

4. The invention as defined by claim 1 wherein said tube further includes a light transparent support for said target and wherein said conductive strip-like layers are interposed between said support and said strip-like elements.

5. The invention as defined by claim 1 wherein said tube further includes a light transparent support for said target and wherein said conductive strip-like layers are of transparent material, said layers being interposed between said support and said strip-like elements.

6. The invention as defined by claim 1 wherein said tube further includes a light transparent support for said target and wherein said conductive layers are of electron-transparent material, said layers being interposed on that side of said strip-like elements adjacent said electron beam producing means.

7. Apparatus for providing indexing information regarding the position of an electron beam within a cathode ray tube of the type in which a plurality of groups of strip-like target elements is traversed by such beam, said apparatus comprising: a group of interdigitated strip-like conductive elements associated in parallelism with each of said groups of target elements and adapted to be traversed in succession by such beam; means electrically joining a first strip-like conducting element of one of said groups with the correspondingly positioned conducting element of each of the other of said groups; means electrically joining a second strip-like conducting element of one of said groups with the correspondingly positioned element of each of the other of said groups; means including an impedance for electrically connecting said first strip-like elements to a source of operating potential; means for connecting said second strip-like elements to a source of the same potential as said first-named potential; and means defining a low impedance path between said second strip-like conducting elements and a point of alternating current ground potential.

8. Apparatus for providing indexing information regarding the position of an electron beam within a cathode ray tube of the type in which a plurality of groups of strip-like target elements is traversed by such beam, said apparatus comprising: a group of interdigitated strip-like conductive elements associated in parallelism with each of said groups of target elements and adapted to be traversed in succession by such beam; means electrically joining a first strip-like conducting element of one of said groups with the correspondingly positioned conducting element of each of the other of said groups; means electrically joining a second strip-like conducting element of one of said groups with the correspondingly positioned element of each of the other of said groups; means including an impedance for electrically connecting said first strip-like elements to a source of operating potential; means for maintaining said second strip-like conducting elements at the same potential as said first strip-like conducting elements; and means for bypassing said last-named means to a point of alternating current ground potential.

9. Apparatus for providing indexing information regarding the position of an electron beam within a cathode ray tube of the type in which a plurality of groups of strip-like target elements is traversed by such beam, said apparatus comprising: a group of interdigitated strip-like conductive elements associated in parallelism with each of said groups of target elements and adapted to be traversed in succession by such beam; means electrically joining a first strip-like conducting element of one of said groups with the correspondingly positioned conducting element of each of the other of said groups; means electrically joining a second strip-like conducting element of one of said groups with the correspondingly positioned element of each of the other of said groups; means including a resistor for electrically connecting said first strip-like elements to a source of operating potential; means including a second resistor for connecting said second strip-like elements to a source of the same potential as said first-named potential; and means defining a low impedance path between said second strip-like conducting elements and a point of alternating current ground potential.

10. Apparatus for providing indexing information regarding the position of an electron beam within a cathode ray tube of the type in which a plurality of groups of strip-like target elements is traversed by such beam, said apparatus comprising: a group of interdigitated strip-like conductive elements associated in parallelism with each of said groups of target elements and adapted to be traversed in succession by such beam; means electrically joining a first strip-like conducting element of one of said groups with the correspondingly positioned conducting element of each of the other of said groups; means electrically joining a second strip-like conducting element of one of said groups with the correspondingly positioned element of each of the other of said groups; means including an impedance for electrically connecting said first strip-like elements to a source of operating potential; means for connecting said second strip-like elements to a source of the same potential as said first-named potential; and capacitive means defining a low impedance path between said second strip-like conducting elements and a point of alternating current ground potential.

11. Apparatus for providing indexing information regarding the position of an electron beam within a cathode ray tube of the type in which a plurality of groups of strip-like target elements is traversed by such beam, said apparatus comprising: a group of interdigitated strip-like conductive elements associated in parallelism with each of said groups of target elements and adapted to be traversed in succession by such beam; means electrically joining a first strip-like conducting element of one of said groups with the correspondingly positioned conducting element of each of the other of said groups; means electrically joining a second strip-like conducting element of one of said groups with the correspondingly positioned element of each of the other of said groups; means including a resistor for electrically connecting said first strip-like elements to a source of operating potential; means including a second resistor for connecting said second strip-like elements to a source of the same potential as said first-named potential; and capacitive means defining a low impedance path between said second strip-like conducting elements and a point of alternating current ground potential.

12. Color television apparatus comprising: a cathode ray tube having means for producing an electron beam and a target comprising a plurality of groups of strip-like elements, each element of a group being definitive of a different selected component color of an image being televised and each group including at least three of said strip-like elements, a strip-like layer of conductive material on each of said color definitive strip-like elements representative of a first color, a strip-like layer of conductive material in each of said groups coextensive with at least a part of each of those strip-like color definitive elements in that group other than that element representative of said first color; means electrically joining only said strip-like layers which are on said elements representative of said first color; means electrically joining only said strip-like layers which are on said elements representative of said other colors; means including an impedance for electrically connecting said first strip-like layers to a source of operating potential; means for connecting said second strip-like layers to a source of the same potential as said first-named potential; and means defining a low impedance path between said strip-like conducting elements and a point of alternating current ground potential.

13. Color television apparatus comprising: a cathode ray tube having means for producing an electron beam and a target comprising a plurality of groups of strip-like elements, each element of a group being definitive of a different selected component color of an image being televised and each group including at least three of said strip-like elements, a strip-like layer of conductive material on each of said color definitive strip-like elements representative of a first color, a strip-like layer of conductive material in each of said groups coextensive with at least a part of each of those strip-like color definitive elements in that group other than that element representative of said first color; means electrically joining only said strip-like layers which are on said elements representative of said first color; means electrically joining only said strip-like layers which are on said elements representative of said other colors; means including a resistor for electrically connecting said first strip-like layers to a source of operating potential; means including a second resistor for connecting said second strip-like layers to a source of the same potential as said first-named potential; and means defining a low impedance path between said strip-like conducting elements and a point of alternating current ground potential.

14. Color television apparatus comprising: a cathode ray tube having means for producing an electron beam and a target including a plurality of groups of strip-like phosphor elements, each phosphor element of a group being capable of emitting light of a different selected component color of an image being televised and each group including at least three of said strip-like phosphor elements, a strip-like layer of conductive material on each of said strip-like phosphor elements representative of a first color and a strip-like layer of conductive material in each of said groups coextensive with at least a part of each of those phosphor elements in that group other than that element representative of said first color; means electrically joining only said strip-like conducting layers which are on said first-named phosphor elements; means electrically joining only said strip-like conductive layers which are on said other phosphor elements; means for causing such electron beam to traverse said target; means including an impedance for electrically connecting said first conducting layers to a source of operating potential; means for connecting said second conducting layers to a source of the same potential as said first-named potential; and means defining a low impedance path between said second conducting layers and a point of fixed potential.

References Cited in the file of this patent

UNITED STATES PATENTS

| | | |
|---|---|---|
| 2,307,188 | Bedford | Jan. 5, 1943 |
| 2,577,368 | Schultz et al. | Dec. 4, 1951 |
| 2,667,534 | Creamer et al. | Jan. 26, 1954 |
| 2,684,454 | Huffman | July 20, 1954 |